No. 853,652. PATENTED MAY 14, 1907.
B. M. STEELE.
CONVEYER.
APPLICATION FILED NOV. 14, 1903.
2 SHEETS—SHEET 1.
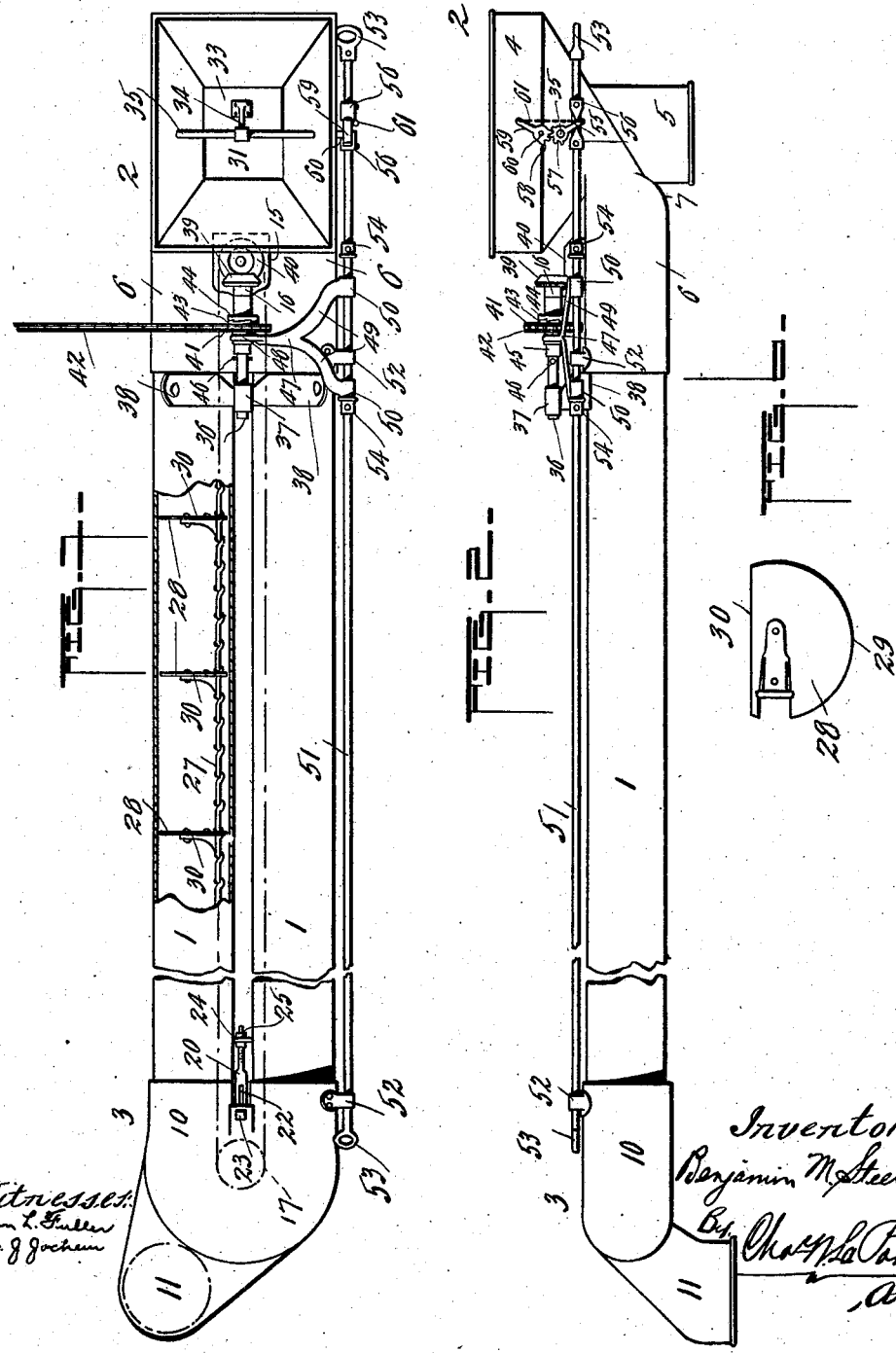
Witnesses:
Inventor,
Benjamin M. Steele

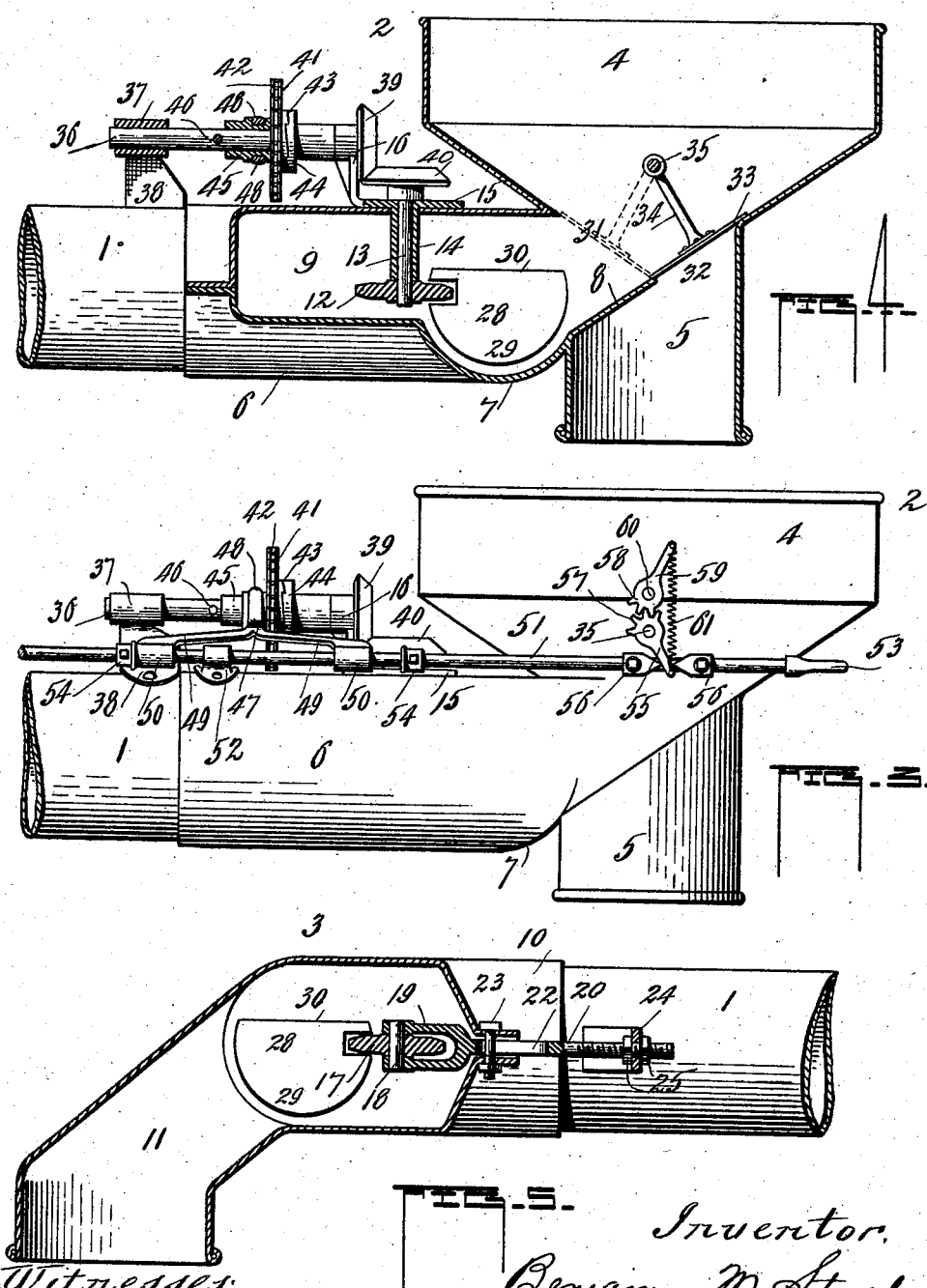

UNITED STATES PATENT OFFICE.

BENJAMIN M. STEELE, OF PEORIA, ILLINOIS, ASSIGNOR TO BEN STEELE WEIGHER MANUFACTURING COMPANY, OF PEORIA, ILLINOIS, A CORPORATION OF ILLINOIS.

CONVEYER.

No. 853,652.  Specification of Letters Patent.  Patented May 14, 1907.

Application filed November 14, 1903. Serial No. 181,119.

*To all whom it may concern:*

Be it known that I, BENJAMIN M. STEELE, a citizen of the United States, residing at Peoria, in the county of Peoria and State of Illinois, have invented certain new and useful Improvements in Conveyers; and I do hereby declare that the following is a full, clear, and exact description of the invention, which will enable others skilled in the art to which it appertains to make and use the same.

This invention has reference to conveyers and more particularly to that class of conveyers now in common use, known as crossconveyers, in which a conductor is employed to convey the grain.

The object of the invention is a conveyer which may be employed upon grain separators, threshing machines or the like adapted to receive grain or other material in one end of the conveyer and deliver the same alternately at each end thereof, discharging it into any suitable receptacle at one side and then reversing the discharge to the opposite side.

A further object of the invention is to improve and simplify the construction of conveyers of this class and more especially the devices which convey the grain and the means for regulating the discharge at opposite ends thereof.

A further object, consists in constructing a conveyer of parallelly arranged tubes connected in head or end sections at the opposite ends thereof. The head or receiving end provided with a regulating valve controlling two exits, the opposite end of the conveyer provided with an obliquely extended and depending exit. Further, a conveyer comprising a chain and flights attached thereto, which said flights are substantially semi-circular in form so that they will only partially cover the entire diameter of the tube, in other words so provided for the purpose of leaving substantially the upper half of the tubes exposed where the flights pass therethrough.

The invention comprises further, a conveyer and a valve controlling the inlet of material to such conveyer, gearing and a rod operatively connected with the gearing and valve, when shifted in one direction to connect the gearing with the conveyer and to shift the valve to direct material to said conveyer; when shifted in the opposite direction to disconnect the gearing, stop the movement of the conveyer and reverse the valve to pass the material entering the hopper of the conveyer, through the same; and means for locking the position of the rod after shifting.

The invention consists in the various features of improvement hereinafter described, illustrated in the accompanying drawings and particularly pointed out by the claims at the end of this specification.

In the drawings:—Figure 1 is a plan view partly in section of a conveyer embodying my improvements; Fig. 2 is an elevation from one side of Fig. 1; Fig. 3 is an enlarged side elevation of the receiving end of the conveyer; Fig. 4 is an enlarged longitudinal sectional view through the receiving end of the conveyer; Fig. 5 is an enlarged longitudinal section of the end of the conveyer opposite to the receiving end thereof; Fig. 6 is a detached view of one of the conveyer flights.

The conveyer comprises in its structure the sheet metal tubes 1, 1 lying parallel beside each other in such a manner as to leave a very narrow opening between the tubes. The tubes at their opposite ends are secured to sections 2 and 3. The section 2 forming the receiving end of the conveyer and is composed of the hopper 4 and the tubular portion 5 to which may be connected a swinging spout, not shown. The receiving or head section 2 is provided with the rearwardly and substantially parallel tubular portions 6 to which it is designed to connect the tubes 1, and between the ends of the tubes and the exit 5 the receiving head is provided with a substantially transverse semi-circular bottom 7 corresponding to the contour of the tubes and designed for a passageway for the flights of the conveyer, to be described, which emerge from one tube, pass through the head section and into the adjoining tube, and, disposed at an incline extends up from the bottom of the portion 6 and from a point where the semi-circular portion 7 meets the wall of the tubular portion forming the exit 5 is a partition or wall 8 terminating at a point central of the exit 5, to contract the mouth of the opening in the exit, as shown in Fig. 4. The manner of constructing the receiving or head end of the conveyer is such, that a chamber 9 is provided in which is carried gearing to be further described for actuating a conveyer, to be described.

Referring to the end section 3, the same is provided with the substantially tubular parallel extensions 10 to which it is designed to connect the tubes 1. Extending obliquely from the rear curved wall of the section 3 is a depending spout or exit 11, adapted to have connected therewith a swinging spout, not shown, forming an exit for material conveyed from the receiving end of the conveyer to the section 3.

In the chamber 9 of the section 2 is carried for horizontal rotation a sprocket wheel 12 supported and rotating on a short shaft 13 which is journaled in a tubular bearing 14 integral with a casting or base-plate 15 resting upon the head 2 outside the chamber 9, and is further provided with a bearing 16 for a purpose to be described. In section 3 is carried for horizontal rotation a sprocket wheel 17 rotating on a spindle 18, journaled in the bifurcated ends 19 of an arm 20. This arm is provided with an extension of considerable length and passes between the matching faces of the depressed walls of the section 3, in such a manner that the arm extends between the matching walls of the tubes 1, 1; and 22 is an elongated slot in the arm 20 through which passes a bolt 23 which also passes through the matching depressed walls 21 of the section 3, as shown. The outer end of the arm 20 is threaded, passes through a bracket or boxing 24 attached to the walls of the tubes and 25 denotes nuts for adjusting the position of the arm 20. The arm 20 as seen, while serving as a support for the sprocket 17 is also a tightener for taking up slack in a conveyer chain traveling around the sprockets 12 and 17. By turning the nut 25, it will cause the arm 20 to be moved forward or backward, depending of course in the direction in which the nut is turned. The conveyer chain is designated as 27 adapted to travel around the sprockets 12 and 17 and through the tubes, and attached to suitable links at intervals are the substantially semi-circular flights 28, having the curved portions 29 corresponding to the contour of the tubes, and the squared portion 30 passing approximately diametrically through the tubes. Employing parallel tubes, as the material is pouring into the conveyer from the receiving hopper, if a circular flight was employed there would be a tendency to clog and to facilitate in a proper handling and conveying the material I use the semi-circular flights shown.

Referring to the hopper 4 of the section 2 it will be noticed that its front wall is cut away as at 31, and its opposite wall intermediate the end of the partition 8 and the point where the wall of the tubular portion 5 depends, is open to form the exit 32. It then follows, that, if one of these openways 31 or 32 be closed, any grain or material, directed into the hopper on its sloping walls, it will be conveyed to which ever openway 31 or 32 is not closed. And for this purpose I have provided an oscillating valve, composed of a plate 33, attached to an arm 34 which swings with a cross-shaft or spindle 35 journaled in the walls of the hopper 4 of the section 2.

In the position in which the plate 33 is shown in Fig. 4, all material passing into the receiving hopper 4 will slide off the plate 33 which is disposed on an incline to coincide with the incline of the partition 8 and cause it to be carried the length of the tubes and allowed to escape through the exit 11. It being understood that when the plate 33 of the valve is in the position shown in Fig. 4 the conveyer chain 27 will be in motion and by the flights 28 thereof the material passing over the partition 8 will be conveyed as above described. By placing the valve with its plate 33 in a position opposite to that shown in Fig. 4 all material passing over the plate will be directed through the exit 5 of the receiving end section 2, and when in this position it is designed to disengage certain parts or gearing which stops the movement of the conveyer chain 28. The devices which control the conveyer chain and valve plate 33 will now be described.

36 denotes a horizonally disposed intermittingly actuated shaft, journaled at one end in the bearing 16 of the casting 15 and its outer end journaled in the bearing 37 supported by the arms 38 secured to the opposite tubes 1, as shown.

39 indicates a gear on the shaft 36 meshing with a gear 40 on the upper end of the shaft 13, when actuated through the movement of the shaft 36 imparting movement to the conveyer chain 27. Motion is imparted to the shaft 36 through a continuously driven chain wheel 41 loosely carried thereon, connected by a chain 42 with suitable power, not shown. The chain wheel has a clutch face 43 adapted to intermittingly engage a clutch member 44 secured to the shaft 36. From the opposite face of the chain wheel is extended a sleeve 45, limited in its longitudinal movement by the cotter or other device 46.

47 denotes a clutch arm having the portion 48 partially encircling the sleeve 44 and the bifurcated extensions 49 provided with the tubular bearings 50, as shown.

51 indicates a trip-rod slidable in bearings 52 attached to the extensions 6 and 10 of the sections 2 and 3, which may be located at other desirable points, and the rod is provided with hand-holds 53 at its opposite ends, whereby an operator may shift the trip-rod from opposite ends of the machine. The rod passes through the tubular ends 50 of the clutch arm or shifter 47, and 54 indicates collars adjustably secured on the rod 51 which engage the tubular bearings 50 in the movement of the rod to shift the arm 47 to cause the clutch face of the sprocket 41 and the coacting clutch member to be engaged or disengaged, which ever is desirable. The connections between the rod 51 and the valve rod 35 are through a short crank arm 55 having a slot through which the rod 51 is carried, and attached to the rod and bearing against the crank 55 are collars 56, by means of which the valve 33 is shifted as the collars' bear against the crank 55 during the shifting of the rod 51. The movement of the shifter 47 and engagement therewith by the collars 50 are timed relative to the movement of the crank 55, so that the valve 33 in the hopper will reach its limit simultaneously to open or close the openings 31 and 32, as the clutch parts engage each other or are reversed, all of which it is believed is understood. To lock the movement of the rod 51 and component parts, after the rod has been shifted, I provide the crank arm 55 with a toothed segment 57 meshing with a toothed segment 58 of a short arm 59 pivoted at 60 to the hopper portion of section 2. The ends of the cranks 55 and 59 are connected by a spring 61, which, as the arms 55 and 59 are oscillated the spring 61 will be shifted across the pivots of the arms and lock the position of the cranks 55 and 59 when so shifted, and the parts connected therewith.

Attention is directed to the manner of controlling the flow of the material through the head section, the clutch mechanism for controlling the intermittent movement of the conveyer and the single rod for simultaneously actuating the clutch parts as the valve in the head section is shifted. This is a new feature in conveyers of this class, as heretofore the valve and clutch mechanism have been operated by an operators rod through several rods, either connected to the operators rod and then the valve and clutch parts, or by rods independent of each other, and more or less of the conveyers require that the conveyer be reversed in its movement, or continuously run in one direction and depend on shifting the valve to do the work. I have aimed to overcome this extra wear on the conveyer, simplify the operation of the parts and reduce the number of parts to a minimum, at the same time providing a positively acting conveyer when in motion and parts operatively connected with the operators rod positive in their movement and doing away with the use of springs on the rod.

Modifications may be resorted to and various changes in detail made throughout the device without affecting the principle and scope of the invention and I do not wish to be confined to the exact showing made.

Having thus fully described my invention, what I claim and desire to secure by Letters Patent of the United States, is:—

1. In a conveyer, the combination of parallel tubes, head and end sections in which the ends of the tubes have a common union, exits in the head and end sections, a valve in the head section, and a conveyer traversing the tubes, capable of being intermittingly actuated as the valve is shifted in opposite directions.

2. In a conveyer, the combination of a pair of parallel tubes, head and end sections in which the ends of the tubes have a common union, exits in the head and end sections, a valve in the head section, a conveyer traversing the tubes, means in operative connection with the valve and conveyer, capable of stopping the movement of the conveyer when shifting the valve in one direction and starting the conveyer with the simultaneous shifting of the valve in an opposite direction.

3. In a conveyer, the combination of a pair of parallel tubes, head and end sections in which the ends of the tubes have a common union, exits in the head and end sections, a conveyer traversing the tubes, a valve in one of said sections, a series of substantially semi-circular flights attached to the conveyer, means in operative connection with the conveyer and valve, capable of stopping the conveyer when shifting the valve in one direction and starting the conveyer with the simultaneous shifting of the valve in an opposite direction.

4. In a conveyer, the combination of a pair of parallel tubes, a head section and an end section in which the ends of the tubes have a common union, an obliquely disposed discharge spout from the end section, a valve in the head section controlling an exit in the head to the tubes and an exit through the head, a conveyer traversing the tubes, and means for shifting the valve and controlling the movement of the conveyer.

5. In a conveyer, the combination of a conveyer tubing having an end outlet, a feed hopper at the opposite end having an exit, a swinging valve adapted to alternately close said hopper exit, a suitable conveyer, gearing for actuating the conveyer, clutch mechanism in such gearing, a trip-rod having connection with the clutch mechanism and valve, when actuated adapted to simultaneously stop the conveyer when the valve is shifted to open the hopper exit and started when the valve is shifted in an opposite direction.

6. In a conveyer, the combination of parallel tubes connected at one end by a head section having a common exit, and at the opposite end by a hopper having a partitioned exit, a valve controlling such exit, a conveyer adapted to travel through said tubes, comprising a sprocket drive and substantially semi-circular flights, gearing for actuating such conveyer, clutch mechanism in such gearing, and a trip-rod having connection with the valve and clutch parts, for the purposes specified.

7. In a conveyer, the combination of parallel tubes connected at one end by a head section having a common exit, and at the opposite end by a hopper having a partitioned exit, a valve controlling such exit, a conveyer adapted to traverse said tubes, a continuously driven sprocket wheel, clutch mechanism, gearing interposed between the clutch mechanism and conveyer, and a trip-rod having connection with the valve and operatively connected with the clutch mechanism to intermittingly clutch the continuously driven sprocket for imparting power to the conveyer.

8. In a conveyer, the combination of conveying tubing, a head and end section connecting said tubing, the head section having a partitioned exit, a valve controlling such exit, a conveyer within the tubing, a continuously driven sprocket, clutch mechanism, gearing interposed between the clutch mechanism and conveyer, and a trip-rod operatively connected with the valve and clutch mechanism for simultaneously starting the conveyer when shifting the valve in one direction, and for stopping the conveyer when shifting the valve in an opposite direction.

9. In a conveyer, the combination of a pair of tubes joined in end sections having exits, and one of such sections having a hopper, a valve controlling the exit in the hopper, a chain conveyer movable through the tubes, gearing for actuating the conveyer, a chain tightener extending through one of said end sections and disposed between the walls of the matching tubes, clutch mechanism for controlling the movements of the conveyer, and means for alternately shifting the valve while at the same time controlling the movements of the clutch parts.

10. In a conveyer, the combination of two tubes joined to head sections, each of which have an exit and one provided with a hopper and a valve controlling its exit, a sprocket wheel mounted for rotation at the head of the tubes and within the head sections, a conveyer traveling around said sprockets and through the tubes having flights of plates substantially semi-circular in outline, gearing for actuating such conveyer, clutch mechanism in such gearing, a trip-rod having connection with means attached to the valve and clutch devices and controlled from opposite terminals for simultaneously stopping the conveyer when shifting the valve to open the hopper exit, and for starting the conveyer when closing said exit.

11. In a conveyer, the combination of a conveyer tubing, head and end sections connecting such tubing, the head section having a partitioned exit, a valve controlling said exit, a conveyer, gearing for actuating said conveyer, clutch mechanism in said gearing, a trip-rod in operative connection with the valve and clutch mechanism, adapted when shifting the valve in one direction to release the clutch parts and stop the movement of the conveyer and when shifting the valve in an opposite direction to unite the clutch parts to impart movement to the conveyer, and means for locking the trip-rod when shifted.

12. In a conveyer, the combination therewith, of a continuously rotating sprocket wheel, gearing interposed between the conveyer and sprocket, clutch parts in such gearing, a trip-rod for intermittingly connecting the clutch parts to stop or start the conveyer, and means controlled by the movement of the trip-rod for locking the movement of such rod after being shifted.

13. In a conveyer, the driving mechanism, comprising a shaft, a continuously driven sprocket on said shaft, gearing, clutch mechanism interposed between said gearing and sprocket, a shifter connected with the clutch parts, a trip-rod operatively connected with the shifter, capable when moved in one direction to cause the clutch parts to engage for simultaneously starting the conveyer through the aforesaid gearing, and when moved in an opposite direction to disengage the clutch parts and thereby stop the movement of the conveyer.

14. In a device of the class described, the combination of a conveying body, gearing for actuating said conveyer, clutch mechanism in said gearing, a swinging valve, a spindle forming a pivot for said valve, an operator's rod, a shifter connected to the rod and clutch mechanism and an arm attached at one end to the valve spindle and its opposite end directly connected to the operator's rod, substantially as specified.

15. In a conveyer, a body having at one end a partitioned exit, conveying means in the body, gearing for actuating said conveyer, clutch mechanism in said gearing, a shifter arm attached to said clutch mechanism, a swinging valve plate adapted to alternately close the partitioned exit, a spindle forming a pivot for said valve plate, an arm of the spindle, an operator's rod having longitudinal movement through the free end of the spindle arm and the shifter, and means on the rod for engaging said arm and shifter, substantially as specified.

16. In a conveyer, a body having at one end a partitioned exit, conveying means in the body, gearing for actuating said conveyer, clutch mechanism in said gearing, a shifter arm connected to said clutch mechanism, a swinging valve having its pivot removed some distance above the aforesaid partition and a plate adapted to alternately close the exits upon opposite sides of said partition, an arm connected to the valve pivot, an operator's rod having longitudinal movement through the free ends of the spindle and the shifter, and adjustable collars on the rod upon opposite sides of the ends of the arm and shifter having a predetermined engagement with said arm and shifter, for the purposes set forth.

17. In a device of the class described, a cross-conveyer formed of a pair of horizontal and parallel tubes connected by head and end sections, the end section thereof provided with an outlet section extending radially in a line oblique with the longitudinal axis of the tubing and projecting downwardly, substantially as specified.

18. In a device of the class described, a cross-conveyer, formed with horizontally arranged and parallel tubes connected by head and end sections, the head section provided with an outlet and a valve adapted to control the inlet to the tubes and the outlet through the head section, and the end sections provided with an outlet section extending radially in a line oblique with the longitudinal axis of the tubing and projecting downwardly, substantially as specified.

19. In a conveyer, the combination of a pair of parallel tubes, an end section to which the ends of the tubes are secured, the same being provided with an integral depressed body portion intermediate the tubes, a conveying apparatus traversing the tubes and through the end section, a slidable member disposed between the tubes and extending into the end section through the depressed portion thereof, a wheel supported by the inner end of the member over which the conveying apparatus is directed, means for actuating said conveyer, and means for adjusting and fixing the position of the said member, substantially as specified.

20. In a conveyer, the combination of a pair of parallel tubes, an end section to which the ends of the tube are secured, the same being provided with a depressed body portion intermediate the tubes, a conveying apparatus traversing the tubes and through the end section, an arm disposed longitudinally between and parallel with the tubes, one end passing through the depressed portion of the end section and provided with a yoke portion carried within said section, a wheel revolubly supported within the end section by the yoke of the arm over which the conveyer is directed, means disposed at or near the opposite end of the arm whereby the same may be adjusted, and means for actuating the said conveyer, substantially as specified.

21. In a conveyer, the combination of a pair of parallel tubes, an end section in which the ends of the tubes are secured, the same being provided with a depressed body portion intermediate the tubes, a conveying apparatus traversing the tubes and through the end section, means for taking up the slack in the conveying apparatus, comprising a rod disposed longitudinally between the tubes and one end thereof passing into the end section through the depressed portion thereof, a wheel carried within the end section by said arm over which the conveying apparatus is directed, a member secured to one of the tubes, a threaded portion of the arm passing through the said member, and adjusting and locking nuts engaging the threaded portion of the arm, substantially as and for the purpose specified.

22. In a conveyer, the combination of an end section provided with substantially tubular parallel extensions 10 and intermediate depressed portions between which is an opening, a pair of parallel tubes their ends joined in the extensions of the end section, a conveyer comprising a chain with flights traversing the tubes and passing through the end section, a chain tightener consisting of a slotted arm disposed between the tubes having one end carried through the opening in the depressed portions of the end section, a wheel carried by the inner end of said arm over which is directed the conveyer chain, a guide supported by the depressed portion of the end section and passing through the slot of said arm, and means for adjusting and locking the position of the said arm, substantially as specified.

23. In a conveyer, the combination of a head or receiving section having a hopper portion and provided with substantially parallel tubular portions 6, a pair of parallel tubes having their ends secured in the tubular portions of the head section, a conveyer comprising a chain and flights traversing the tubes and adapted to pass through the head section, the said head being provided with a transverse depressed body of substantially the same contour as the lower edge of the flights and serving as a passageway for the said flights, means for operating the said conveyer chain, and a valve suitably disposed in the head section, all substantially as and for the purposes set forth.

24. In a conveyer, the combination of conveying tubing, head and end sections in which the tubing is suitably secured, exits in the head and end sections, a valve in the head section and a conveying device operating in the tubing, the same capable of being intermittingly actuated as the valve is shifted in opposite directions, substantially as specified.

25. In a conveyer, the combination of a head section and an end section, a pair of cylindrical conveying tubes arranged parallel with each other with their ends joined in the said head and end sections, driving and driven sprocket wheels located at the terminals of the said tubes, and within the said sections, a sprocket chain traversing the tubes and around the wheels aforesaid, and a series of semi-circular flights attached to said chain at intervals, substantially as and for the purposes specified.

26. In a conveyer, the combination of a pair of cylindrical tubes having their opposite ends connected in end sections, driving and driven sprockets located in said end sections, a sprocket chain traversing the tube and around said sprockets, flights consisting of flat plates spaced at suitable intervals on said chains and connected at one corner thereto, the lower portions of the flights being circular to conform to the contour of the tubes, and the upper sections of the flights cut away to leave a free space, the full width of the flights between the axial center of the tubes and the upper semi-circular portions thereof, and mechanism for controlling the movements of the conveyer chain.

In testimony whereof I affix my signature, in presence of two witnesses.

BENJAMIN M. STEELE.

Witnesses:
CHAS. W. LA PORTE,
ROBERT N. McCORMICK.